(12) United States Patent
    Hassak

(10) Patent No.: US 12,644,591 B1
(45) Date of Patent: Jun. 2, 2026

(54) MODULAR USB INPUT DEVICE WITH PROGRAMMABLE ACTIONS AND LED FEEDBACK

(71) Applicant: Case Adam Hassak, Paramus, NJ (US)

(72) Inventor: Case Adam Hassak, Paramus, NJ (US)

(73) Assignee: Cryofox LLC, Paramus, NJ (US)

( * ) Notice: Subject to any disclaimer, the term of this patent is extended or adjusted under 35 U.S.C. 154(b) by 0 days.

(21) Appl. No.: 19/253,813

(22) Filed: Jun. 28, 2025

Related U.S. Application Data

(63) Continuation-in-part of application No. 19/171,195, filed on Apr. 5, 2025, and a continuation-in-part of application No. 19/095,026, filed on Mar. 31, 2025.

(51) Int. Cl.
| | |
|---|---|
| *F21V 33/00* | (2006.01) |
| *G06F 3/02* | (2006.01) |
| *F21W 111/00* | (2006.01) |
| *F21Y 115/10* | (2016.01) |

(52) U.S. Cl.
CPC ............ *F21V 33/0052* (2013.01); *G06F 3/02* (2013.01); *F21W 2111/00* (2013.01); *F21Y 2115/10* (2016.08)

(58) Field of Classification Search
CPC .... F21V 33/0052; G06F 3/02; F21Y 2115/10; F21W 111/00
See application file for complete search history.

(56) References Cited

U.S. PATENT DOCUMENTS

| | | | | |
|---|---|---|---|---|
| 5,543,594 | A * | 8/1996 | Romero-Herrera | .......................... H01H 13/023 200/314 |
| 8,878,087 | B2 * | 11/2014 | Lee | ........................ H01H 13/84 362/23.05 |
| 2014/0197015 | A1 * | 7/2014 | Ikeuchi | ................... G07F 17/32 200/314 |
| 2018/0087752 | A1 * | 3/2018 | Atkinson | ............... H05B 47/16 |

(Continued)

OTHER PUBLICATIONS

Youtube Video: Smashing Big Red Button to Leave a Conference Call by Krisseck (https://www.youtube.com/watch?v=inZPdd-Y3Go) (Year: 2021).*

(Continued)

*Primary Examiner* — Zheng Song

(57) ABSTRACT

A modular USB-connected push-button device featuring a tactile button protected by a hinged or removable transparent lid with an integrated handle is disclosed. The device includes one or more sensors, such as Hall-effect, optical, or mechanical types, configured to detect the lid's open or closed position. RGB LEDs surround the button and enclosure frame, diffused through a translucent housing for enhanced visual feedback. An onboard microcontroller manages lighting effects and communicates via a USB communication protocol with companion software. This software enables users to define custom action sequences (macros) triggered by lid position changes and button interactions (press or hold), and to program dynamic LED lighting behaviors accordingly. Each device possesses a unique identifier, allowing simultaneous connection and individualized (Continued)

or synchronized profiles. The invention provides intentional, customizable user interaction and visual feedback, suitable for gaming, productivity workflows, and future modular enhancements.

20 Claims, 5 Drawing Sheets

(56) References Cited

U.S. PATENT DOCUMENTS

2019/0068731 A1* 2/2019 Spicer ..................... H04L 67/55
2020/0306001 A1* 10/2020 Silver ....................... F21L 4/00
2021/0388979 A1* 12/2021 Maderic ............... A41D 27/085

OTHER PUBLICATIONS

Youtube Auto-generated Transcript of Smashing Big Red Button to Leave a Conference Call by Krisseck (Year: 2021).*
CompuPhase—USB Dome Button (https://www.compuphase.com/usbkey/usbbutton_en.htm) (Year: 2024).*
CompuPhase—Wireless Dome Button (https://www.compuphase.com/usbkey/rfbutton_en.htm) (Year: 2021).*
CompuPhase—USB Pushbutton (https://www.compuphase.com/usbkey/usblcbutton_en.htm) (Year: 2021).*

* cited by examiner

MODULAR USB INPUT DEVICE WITH PROGRAMMABLE ACTIONS AND LED FEEDBACK

CROSS-REFERENCE TO RELATED APPLICATION

This application is a continuation-in-part of U.S. Non-provisional application Ser. No. 19/171,195, filed on Apr. 5, 2025, which is a continuation-in-part of U.S. Nonprovisional application Ser. No. 19/095,026, filed on Mar. 31, 2025. The entire disclosures of both prior applications are incorporated herein by reference.

FIELD OF THE INVENTION

The present invention relates generally to USB-connected input devices, particularly modular button devices capable of transmitting user interactions processed by software to produce configurable action sequences and dynamic LED lighting effects. More specifically, it pertains to input devices integrating protective lids with sensor detection and customizable visual feedback, especially suited for gaming, productivity workflows, and other scenarios benefiting from intentional macro programming and multi-sensory interaction.

BACKGROUND OF THE INVENTION

Gamers and tech enthusiasts frequently utilize programmable input devices to execute complex macros or automated action sequences quickly and efficiently. Conventional input devices typically rely on rigid firmware logic, limiting customization, ease of updates, and adaptability to individual user needs. Accidental activation of programmable buttons can disrupt workflows or gaming sessions, underscoring the need for more intentional interaction mechanisms. Additionally, traditional input devices generally lack engaging visual feedback, such as customizable RGB lighting patterns that reflect device states or actions.

Consequently, there exists demand for a novel input device explicitly designed for intentional, protected user interaction. Such a device would ideally offer intuitive, software-driven configuration of action sequences, and deliver clear, dynamic visual feedback responsive to device state changes. It should incorporate context-aware interaction mechanisms, such as removable or hinged protective lids, to prevent accidental activation while enhancing the overall user experience with customizable lighting effects. This combination of intentional activation, aesthetic engagement, and flexible configuration significantly improves user experiences, particularly for gaming and productivity-focused applications.

SUMMARY OF THE INVENTION

The present invention provides a modular USB-connected input device featuring a tactile push-button enclosed under a hinged or removable transparent lid with an integrated handle, ensuring intentional user interactions. The device incorporates sensors—such as Hall-effect, optical, or mechanical types—to detect lid position (open or closed) and integrates RGB LED lighting diffused through translucent housing materials to deliver dynamic visual feedback based on device states or user-defined actions.

An onboard microcontroller communicates via a custom USB Human Interface Device (HID) protocol, transmitting signals indicating lid events and button interactions (press or hold) to companion software running on a host computer. This software enables users to program custom action sequences (macros), conditional logic, and configurable LED lighting behaviors triggered by specific events. Each physical unit possesses a unique device identifier, facilitating simultaneous connection and distinct configuration of multiple devices.

The invention further anticipates alternative embodiments, such as wireless communication and other modular input configurations. By combining intentional activation mechanisms, customizable visual feedback, and powerful software-defined action timelines, this invention significantly enhances user interactions, particularly in gaming and productivity environments.

DETAILED DESCRIPTION OF THE INVENTION

The present invention is a modular USB-connected input device (generally designated as device 10) that combines a unique hardware interface—namely, a large tactile button positioned beneath a transparent lid—with a flexible software system configured to execute programmable action sequences. Device 10 is designed to provide physical interaction feedback through a hinged or removable transparent lid 14, a large tactile button 12, and multi-color LED indicators 22 and 26, while also enabling digital functionality via communication with a host computer through a USB Human Interface Device (HID) protocol.

Figure 4:
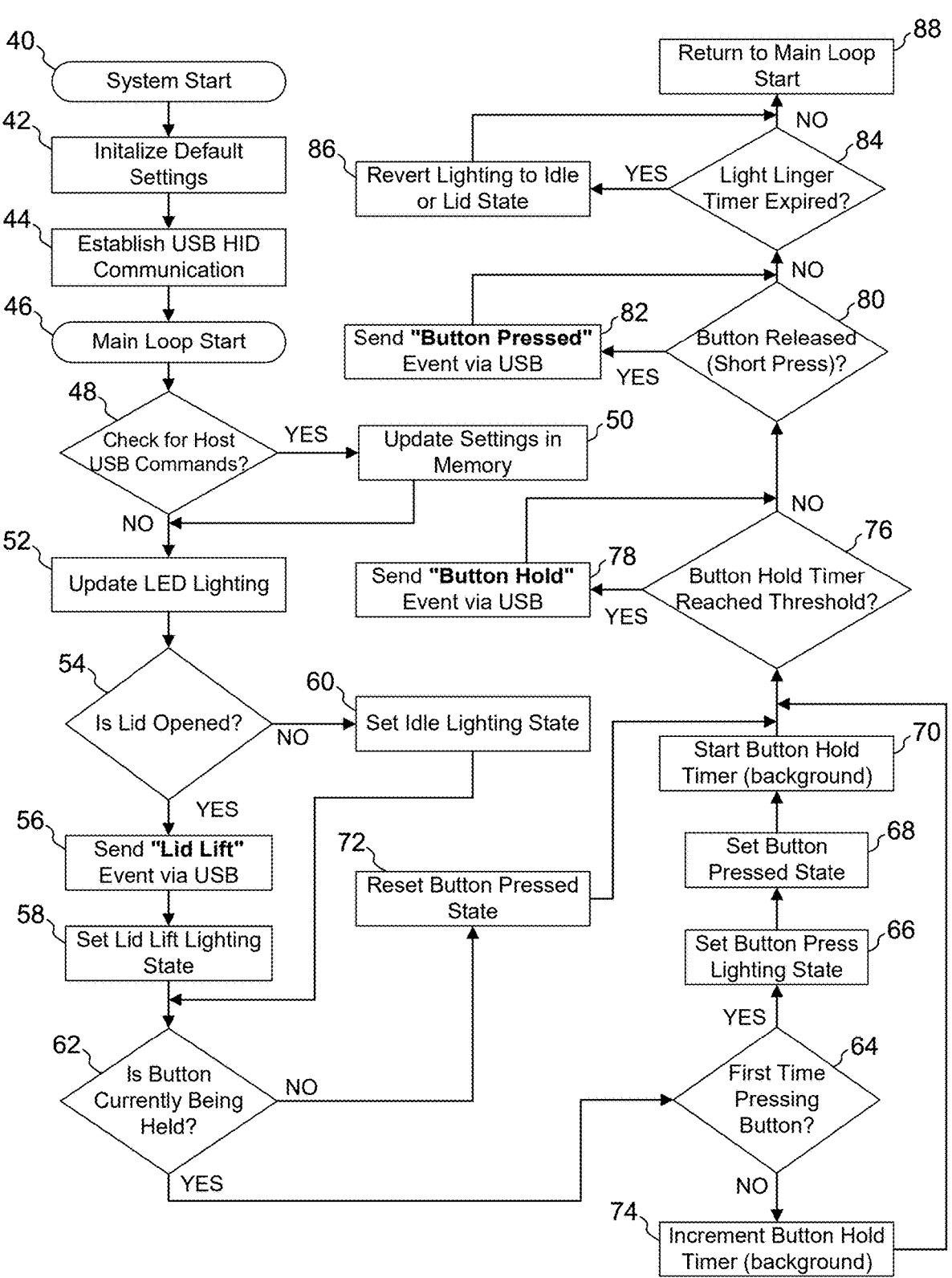
FIG. 4 is a software flowchart detailing the logic executed by the onboard microcontroller, describing the operational steps in response to lid position changes and button interactions, management of lighting states, and communication of events via USB.
Figure 5:
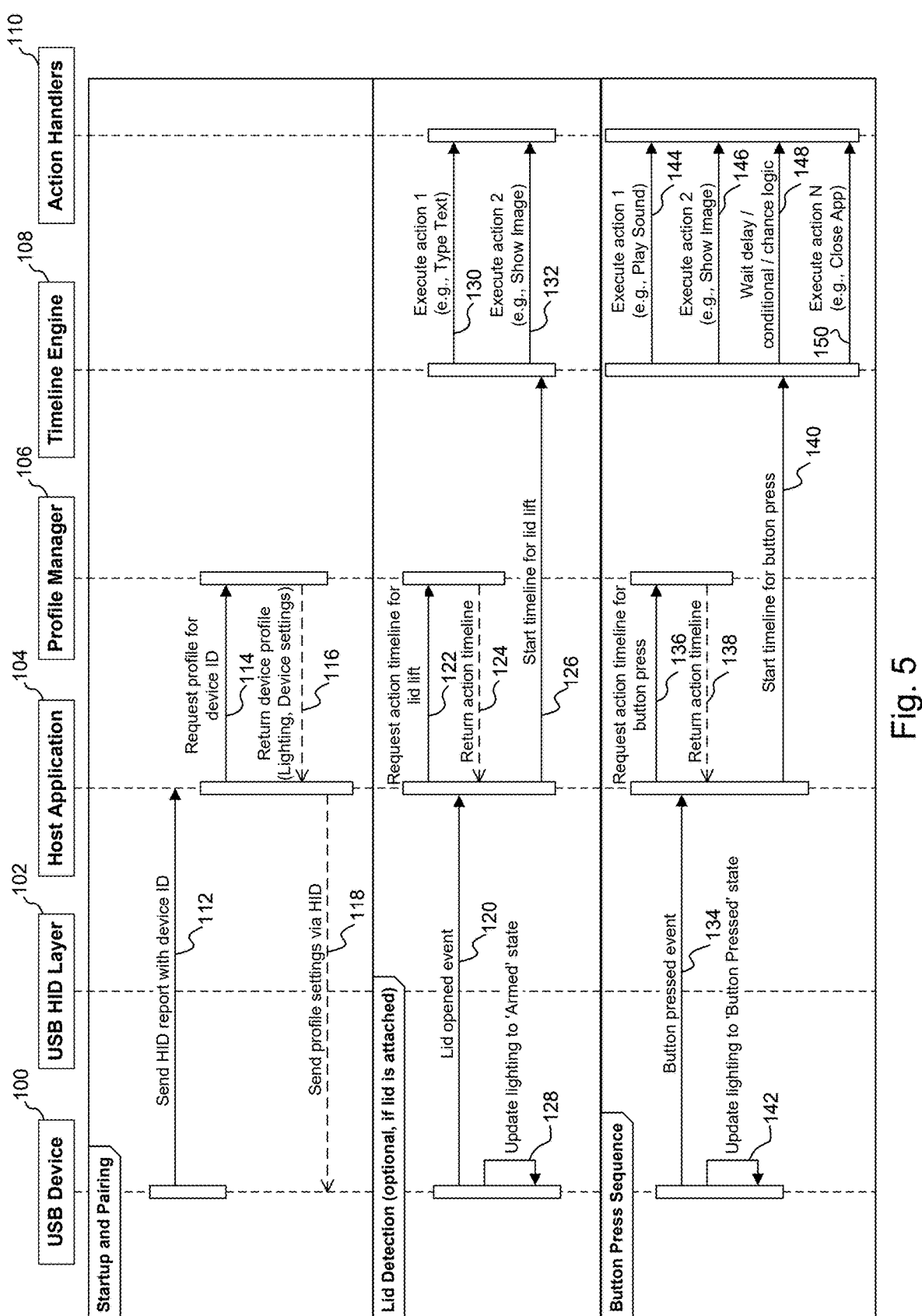
FIG. 5 is a sequence diagram illustrating interactions among the USB device, host application, profile manager, timeline engine, and action handlers, depicting the software logic governing customizable action sequences and LED feedback triggered by user inputs and device states.

A detailed description of an exemplary embodiment is provided below with reference to FIGS. 1 through 5. This description includes the physical structure and components of the device (FIGS. 1-3), the firmware logic executed by the device's onboard microcontroller (FIG. 4), and the operation of the companion host software including profile management and action timeline execution (FIG. 5).

For consistency and clarity, the same reference numerals are used to indicate identical components across the various figures. It should be understood that this embodiment is illustrative only, and that modifications—such as replacing the Hall-effect sensor with an optical or mechanical switch for lid detection, or implementing alternative macro actions within the software—may be made without departing from the scope of the invention.

Figure 1:
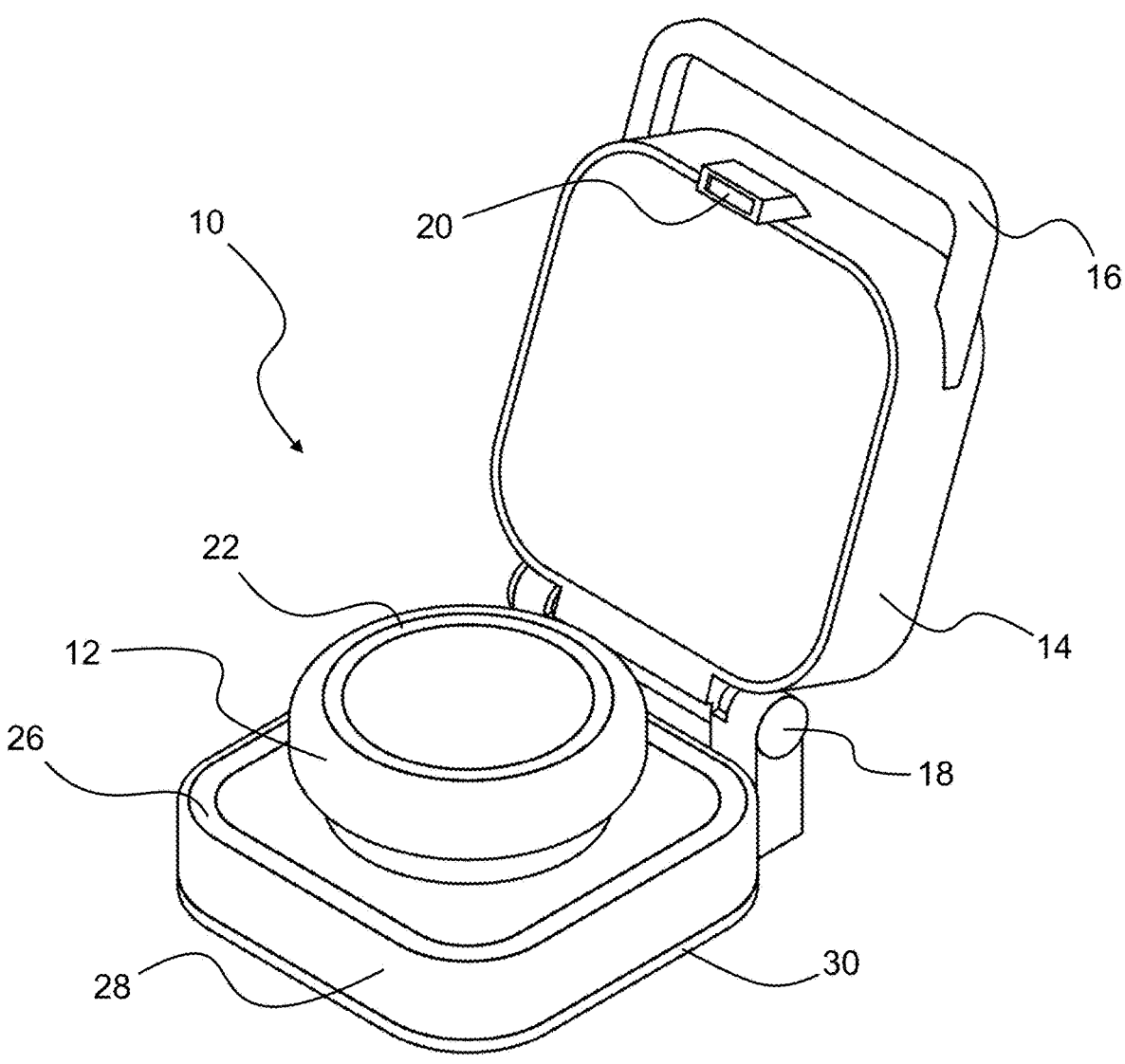
FIG. 1 is a perspective view of the modular USB-connected input device in an open configuration, illustrating a tactile button with integrated RGB LED diffused plastic component, a diffused plastic rim on the bottom shell for additional LED illumination, a hinged transparent lid with an integrated handle, and a magnet configured for detection via a Hall-effect sensor.
Figure 2:
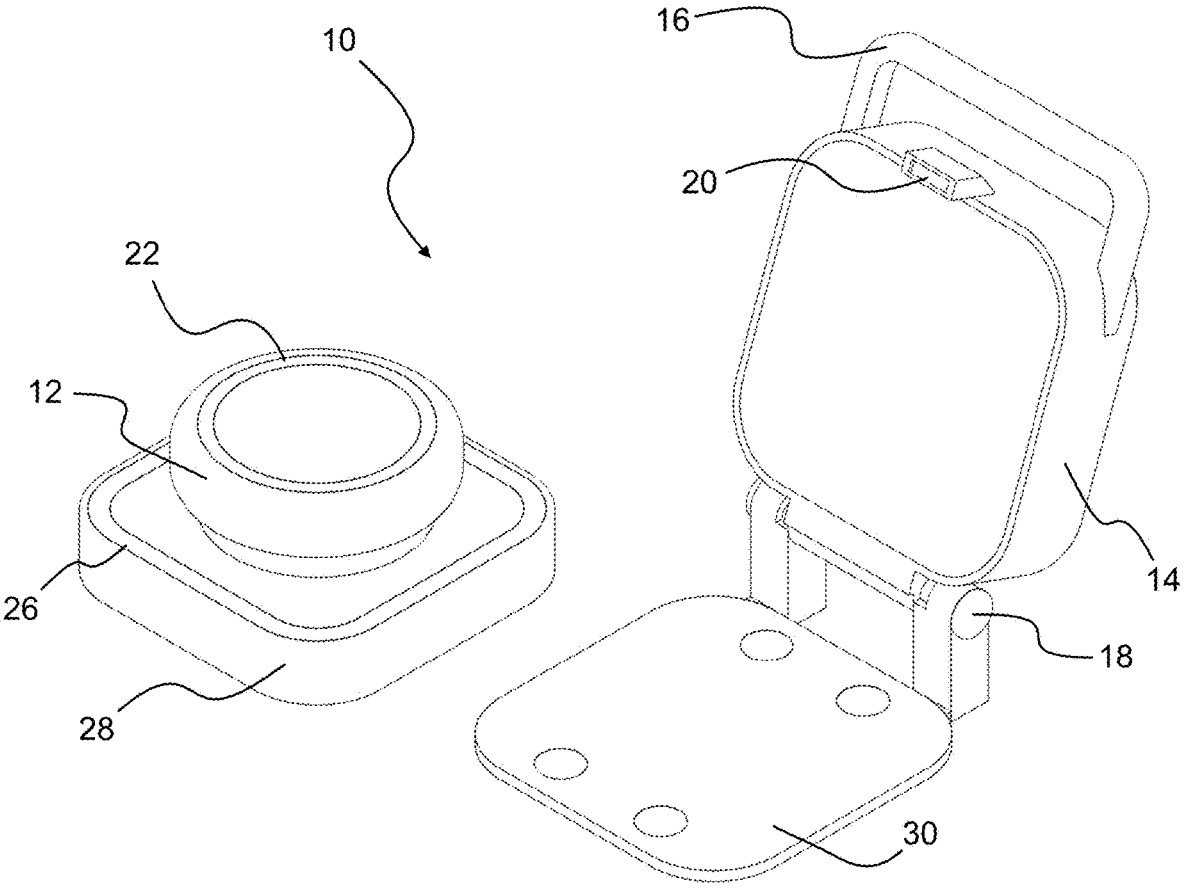
FIG. 2 is a perspective exploded view of the device, depicting the tactile button assembly separated from the hinged transparent lid assembly, clearly showing the button, RGB LED diffused plastic components around the button and bottom shell, and illustrating the removable or hinged lid, handle, hinge mechanism, and integrated magnet.
Figure 3:
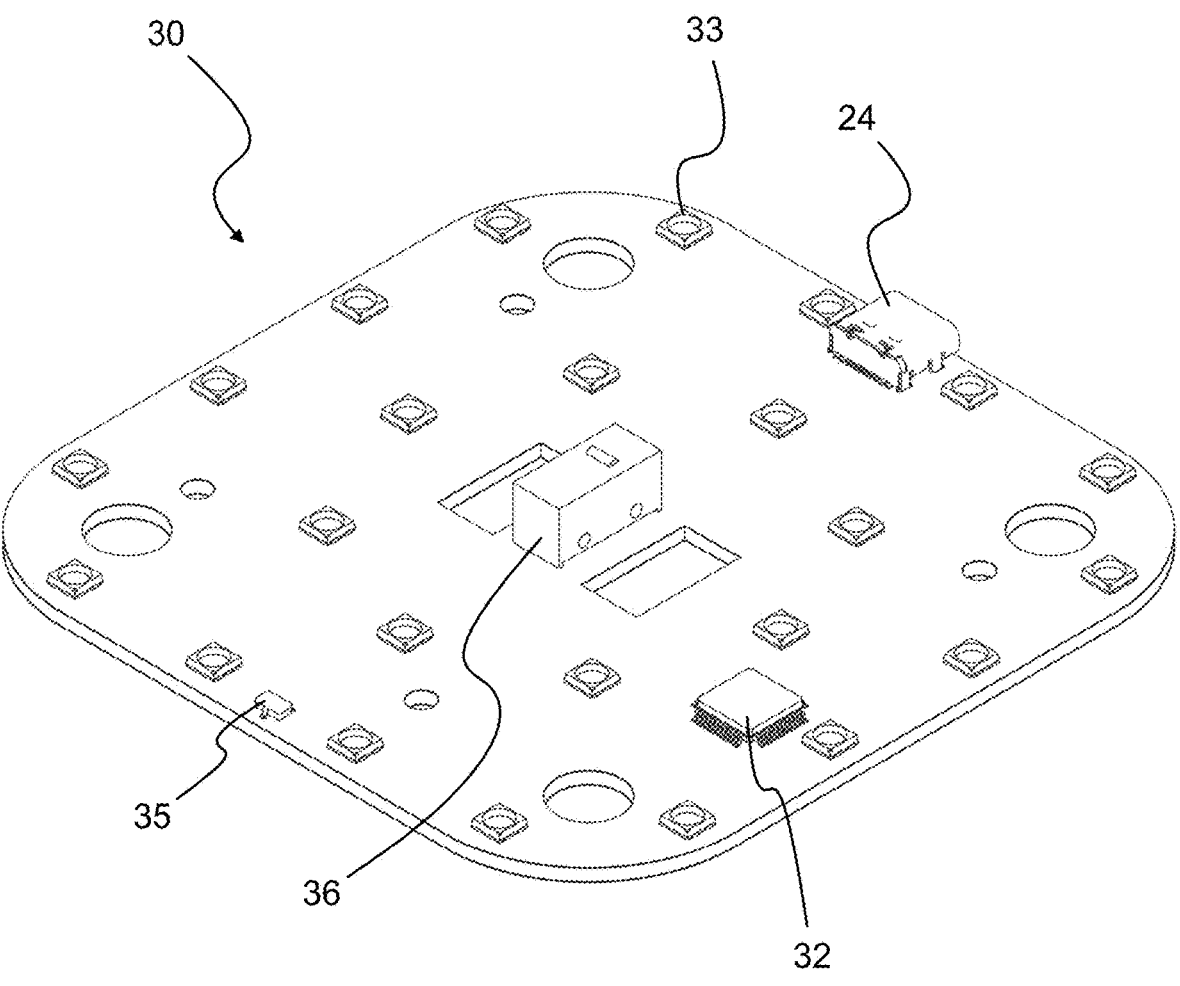
FIG. 3 is a schematic view of the printed circuit board (PCB), illustrating key internal electronic components, including the USB connector, RGB LED array, microcontroller, Hall-effect sensor for lid detection, and tactile button sensor.

Device Structure (FIGS. 1-3)

Overall Assembly:

Referring to FIG. 1, the device 10 is shown in a perspective view with its transparent lid 14 in the open position. The device 10 includes a base enclosure 28 that houses the internal components and provides structural support for external elements. The lid 14 is composed of a clear, rigid material (e.g., transparent plastic) and is dimensioned to cover a large tactile button 12 located on the top surface of the base 28.

In the depicted embodiment, the lid 14 is attached to the base via a hinge 18 positioned along one edge, allowing the lid to pivot between a closed position (covering the button 12) and an open position (exposing the button, as shown). Lifting the lid 14 grants access to the button 12 for intentional user interaction.

In alternative embodiments, the lid 14 may be fully removable rather than hinged—for example, it may attach via a snap-fit, magnetic, or twist-lock mechanism (not shown), enabling modular reconfiguration or replacement.

The transparent construction of the lid 14 permits continuous visibility of the button 12 and any underlying LED indicators when the lid is closed, while providing protection against unintended actuation. The button 12 is a prominent, slightly elevated actuator designed for ease of use and rapid engagement. In one implementation, the button is supported by an internal spring mechanism to facilitate return motion after being pressed. The modular nature of device 10 allows for simultaneous connection of multiple units to a host system, each distinguishable via a unique device identifier and individually configurable. In some versions, the lid 14 and outer shell components may be replaced or customized without requiring modification to the core electronic assembly.

Exploded View of Components (FIG. 2):

Referring to FIG. 2, an exploded view illustrates the principal components of the modular input device. The tactile button assembly includes a large user-actuated button 12, mounted onto an upper base shell 28. Surrounding the button 12 is a ring-shaped translucent element 22, functioning as a diffuser for integrated RGB LEDs to provide uniform illumination during operation. A second translucent diffuser 26 is positioned around the perimeter of the base shell 28, configured to diffuse light from additional internal LEDs, creating a lower ambient glow effect.

Also depicted is a removable base component 30, which magnetically or mechanically attaches to the underside of the device. The lid assembly includes a transparent lid 14, an integrated handle 16, and an embedded magnet 20, all of which are shown separately in FIG. 2. The lid 14 is pivotally mounted to the base structure by hinge components 18, which interface with the base component 30. When fully assembled, the lid 14 covers the button 12, and the magnet 20 is positioned adjacent to a Hall-effect sensor (not visible in this view) located on the internal PCB, enabling the device to detect whether the lid is in an open or closed position. In alternative embodiments, the lid detection mechanism may include other types of sensors, such as a mechanical switch or an optical detector.

The bottom component 30 is not a cover for the internal electronics, but rather a modular structural attachment that supports the lid assembly and provides mechanical connection to the main enclosure. This modular construction facilitates disassembly and customization, allowing the lid or bottom elements to be removed, replaced, or upgraded without altering the internal electronics.

Internal Electronics (FIG. 3):

Referring now to FIG. 3, the internal electronic components of the modular input device are illustrated, with a focus on the printed circuit board (PCB) and its mounted components. A printed circuit board 30 is positioned within the base 28 (see FIG. 1-2) and supports the device's key electronics.

The PCB 30 includes a microcontroller 32 that serves as the central processing unit of the device. The microcontroller 32 interfaces with a USB connector 24, which provides communication with a host computer via a USB Human Interface Device (HID) protocol. Also mounted to the board are a plurality of RGB LEDs 33, a Hall-effect sensor 35, and a tactile switch 36.

The microcontroller 32 is programmed to detect signals from the lid sensor and button switch and to control the LED indicators accordingly. It also stores firmware for real-time event handling and includes or references a unique device identifier to distinguish multiple connected units. The USB connector 24 (e.g., a USB-C or Micro-USB port) enables communication between the device and a host computer via the USB Human Interface Device (HID) class. Although the device uses a custom HID report format, it is recognized by the host system without requiring proprietary drivers.

The RGB LEDs 33 are arranged along the PCB to direct light toward the translucent diffusers 22 and 26 (see FIG. 1-2), which produce visual feedback through the button and base enclosure. Only one LED 33 is labeled for clarity in the drawing, but multiple such LEDs are distributed across the board to enable ring-shaped or full-surface illumination. The microcontroller 32 can adjust LED brightness and color individually or in sequence, allowing effects like pulsing, flashing, or solid-state feedback in response to user actions or software instructions.

The Hall-effect sensor 35 is positioned near the edge of the PCB, aligned with the magnet 20 embedded in the lid 14 (see FIG. 1-2). When the lid is closed, the sensor 35 detects the magnetic field and signals the microcontroller 32 that the lid is closed. When the field is absent, the lid is interpreted as open. Alternate sensor types (e.g., mechanical switches or optical detectors) may be substituted for the Hall-effect sensor 35, depending on implementation preference.

Finally, the tactile switch 36 mounted on the PCB is aligned beneath the large external button 12 (see FIGS. 1-2). When the button 12 is pressed, it physically actuates the underlying switch 36, which closes to register an input with the microcontroller 32. The switch 36 may be implemented as a spring-loaded tactile pushbutton, a mechanical keyboard-style switch, or another type of high-cycle component, designed to provide reliable on/off actuation and withstand repeated presses over time.

In summary, the internal PCB 30 integrates all key electronics required for detecting lid and button inputs, controlling RGB lighting, and facilitating bidirectional communication with the host computer.

Firmware Logic (FIG. 4):

The device's microcontroller 32 executes firmware that manages LED control, input event handling, and USB communication. Referring to FIG. 4, the flowchart depicts the firmware's operational logic from startup through ongoing event handling in a continuous loop.

At startup (System Start 40), the firmware initializes device parameters (Initialize Default Settings 42), establishes communication with the host computer via USB as a HID-class device (Establish USB HID Communication 44), and then enters the main execution loop (Main Loop Start 46).

Within the main loop, the firmware first checks for USB output reports from the host (Check for Host USB Commands? 48). These commands may include updates to runtime parameters such as button hold threshold, LED brightness, or animation profiles. If new settings are received, they are applied and stored in volatile memory (Update Settings in Memory 50).

The firmware then proceeds to update the LED lighting state (Update LED Lighting 52). This includes controlling RGB LED patterns or static colors based on current device state, user profiles, or host commands.

Next, the lid position is evaluated (Is Lid Opened? 54). This is done by sampling the Hall-effect sensor 35 to determine if the magnet 20 in the lid 14 is no longer detected, which signals that the lid has been opened. If a lid-open event is detected, the firmware transmits a "Lid Lift" event to the host (Send "Lid Lift" Event via USB 56) and updates the LED lighting to reflect the new state (Set Lid Lift Lighting State 58). If the lid is closed, the firmware maintains or returns to an idle lighting state (Set Idle Lighting State 60), unless overridden by other events.

The firmware then checks for button activity (Is Button Currently Being Held? 62). If the button 12 is being actuated, the firmware evaluates whether it is the initial press (First Time Pressing Button? 64). If so, it sets a visual feedback state to indicate the button press (Set Button Press Lighting State 66), marks the button as pressed (Set Button Pressed State 68), and begins tracking the duration of the hold (Start Button Hold Timer 70). This lighting remains active while the button is held.

If the button continues to be held across multiple loop iterations, the firmware increments the hold timer in the background (Increment Button Hold Timer 74). Once the hold duration reaches a configured threshold (Button Hold Timer Reached Threshold? 76), the firmware sends a "Button Hold" event to the host (Send "Button Hold" Event via USB 78) and resets the internal pressed state to avoid re-triggering.

If the button is instead released before reaching the hold threshold (Button Released (Short Press)? 80), the firmware sends a "Button Pressed" event (Send "Button Pressed" Event via USB 82) and resets the pressed flag.

After a button event (press or hold), the firmware optionally keeps the LED state active for a defined duration using a light linger timer (Light Linger Timer Expired? 84). Once expired, the device transitions back to the idle or lid-lighting state as appropriate (Revert Lighting to Idle or Lid State 86).

Finally, the loop returns to the top (Return to Main Loop Start 88), continuing this cycle to process subsequent input and communication events in real-time.

Host Software Operation (FIG. 5):

Referring to FIG. 5, the host system communicates with the USB device 10 through a dedicated application comprising multiple coordinated software components. These include the USB HID interface layer 102, host application 104, profile manager 106, timeline engine 108, and action handler modules 110. Together, they allow programmable and contextual responses to user interactions with the device, such as lid lifting and button presses.

Startup and Pairing:

Upon initial connection or power-on, the USB device 10 transmits a HID report containing its unique device identifier (Send HID report with device ID 112). The host application receives this identifier and queries the profile manager (Request profile for device ID 114) to retrieve the associated configuration profile (Return device profile 116). This profile includes settings such as preferred LED patterns, sensor behavior, and action timelines. The host then sends relevant profile parameters back to the device over HID (Send profile settings via HID 118), ensuring that the device reflects the user's saved preferences for behavior and visual output.

Lid Detection Event:

If the lid 14 is opened, the device detects the event via its Hall-effect sensor and sends a corresponding notification to the host (Lid opened event 120). The host application processes this event and requests the associated timeline for a lid-lift event from the profile manager (Request action timeline for lid lift 122). The timeline manager returns a defined sequence of actions (Return action timeline 124), which is then executed (Start timeline for lid lift 126).

Before or during execution of the timeline, the host may also update the device's LED feedback to indicate its "armed" 128. The timeline engine then proceeds to call the appropriate action handlers, such as displaying text 130 or showing an image 132, based on the user's configured preferences.

Button Press Sequence:

Referring again to FIG. 5, when the user performs a short press on the button 12, the device sends a "button pressed" event to the host system 134. Upon receiving this event, the host software typically updates the device's LED indicators to reflect the "Button Pressed" state 142, providing immediate visual feedback to the user.

The host application then requests the corresponding action timeline for the button press from the Profile Manager 136, receives the defined sequence 138, and initiates execution via the timeline engine 140.

The timeline engine proceeds to execute the user-defined actions in sequence. As shown in FIG. 5, this may include:

Step 144: Playing a sound (e.g., audio confirmation)

Step 146: Displaying a visual element (e.g., showing an image or notification)

Step 148: Processing a delay, conditional logic, or probabilistic decision

Step 150: Performing a final system action (e.g., closing an application)

Each step is executed through the appropriate Action Handler module within the host software. These handlers manage tasks such as application control, input simulation, media output, and LED feedback. The entire process is governed by the user's configuration profile, allowing the system to produce a flexible and context-sensitive response to a single button press.

Multi-Device Support:

Each connected device 10, identified by a unique ID, can operate independently or in coordination with other devices. The host software can manage multiple timelines concurrently, assigning different profiles or synchronized behaviors to each. Profiles can be updated or swapped dynamically, and the action handler architecture permits future extensions without requiring firmware updates to the device.

In summary, the host software orchestrates device behavior beyond raw input transmission. Through structured event reporting, programmable timelines, and dynamic action execution, it enables intuitive yet powerful control workflows while maintaining tight synchronization with the hardware's LED feedback and state tracking.

The invention claimed is:

1. A modular USB-connected input device comprising: a housing; at least one user-interaction sensor configured to detect a physical button press or touch and to transmit a corresponding signal to a microcontroller; a protective lid attached to said housing, movable between an open position exposing the physical button and a closed position covering the physical button; at least one sensor configured to detect and signal the position of the lid; one or more LED indicators integrated into the physical button or the housing, configured to provide customizable visual feedback through light emitted via one or more translucent, semi-transparent, frosted, or light-scattering structural elements; the microcontroller disposed within said housing; a USB communication interface coupled to said microcontroller, configured to transmit input state data and receive control commands from a host computer using a USB communication protocol; wherein said microcontroller is configured to:

detect a transition of the protective lid between the closed position and the open position and generate a lid transition event independent of button activation;

detect button press events and button hold events as distinct event types based on duration of actuation of the user-interaction sensor;

transmit the lid transition event and the button press or button hold events to the host computer as distinct input state signals, and control the LED indicators based on at least one of (i) lid position, (ii) lid transition events, and (iii) button interaction state, including maintaining different lighting states corresponding to lid-open, lid-closed, button-pressed, and idle conditions.

2. The device of claim 1, wherein each LED indicator comprises an RGB LED configured to produce full-color lighting effects.

3. The device of claim 1, wherein the lid is transparent or translucent.

4. The device of claim 1, wherein the lid is hinged to the housing.

5. The device of claim 1, wherein the lid is removably attachable to the housing.

6. The device of claim 1, wherein the sensor configured to detect the lid's position comprises a Hall-effect sensor.

7. The device of claim 1, wherein the sensor configured to detect the lid's position comprises a mechanical switch.

8. The device of claim 1, wherein the sensor configured to detect the lid's position comprises a proximity sensor selected from infrared, capacitive, or time-of-flight technologies.

9. The device of claim 1, further comprising companion software running on the host computer, configured to interpret signals from the device, execute user-defined action sequences, and optionally control the LED indicators.

10. The device of claim 9, wherein the companion software enables users to define conditional logic within action sequences triggered by device signals.

11. The device of claim 9, wherein the action sequences include at least one of: simulated keystrokes, media playback, application launching, visual notifications, or network events.

12. The device of claim 1, wherein each input device includes a unique device identifier enabling individualized or synchronized behavior when multiple devices are connected to the host computer.

13. The device of claim 1, wherein the microcontroller is configured to trigger a predefined LED lighting pattern in response to detection of the lid transitioning from the closed position to the open position.

14. The device of claim 1, wherein the microcontroller is configured to differentiate between short presses and prolonged holds of the user-interaction sensor, based on configurable duration thresholds.

15. The device of claim 1, wherein the microcontroller is configured to trigger a predefined LED lighting pattern in response to a button press event.

16. The device of claim 9, wherein the companion software maintains multiple user-defined profiles, each associating specific action sequences and LED behaviors with distinct device identifiers or interaction types.

17. The device of claim 1, wherein the communication interface comprises a wireless transceiver, and the device further includes a power source enabling wireless communication with the host computer via Bluetooth, Wi-Fi, or a proprietary wireless protocol.

18. The device of claim 1, wherein the LED indicators are arranged in a ring surrounding the user-interaction sensor and are optically diffused through a translucent ring-shaped element.

19. A modular USB-connected input device comprising: a physical button configured to detect a press event and transmit a signal to a microcontroller; the microcontroller configured to transmit a signal to a host computer over a USB interface in response to the button press event; wherein the signal includes a unique device identifier associated with the input device, and the host computer is configured to automatically select a user profile stored on the host computer based on the identifier, the profile comprising predefined lighting behavior and one or more associated user-defined action sequences, which are executed by the host computer.

20. The device of claim 19, wherein the host computer executes the user-defined action sequences and applies the lighting behavior based on the selected user profile, enabling distinct behavior for each device or profile.

* * * * *